Figure 1:
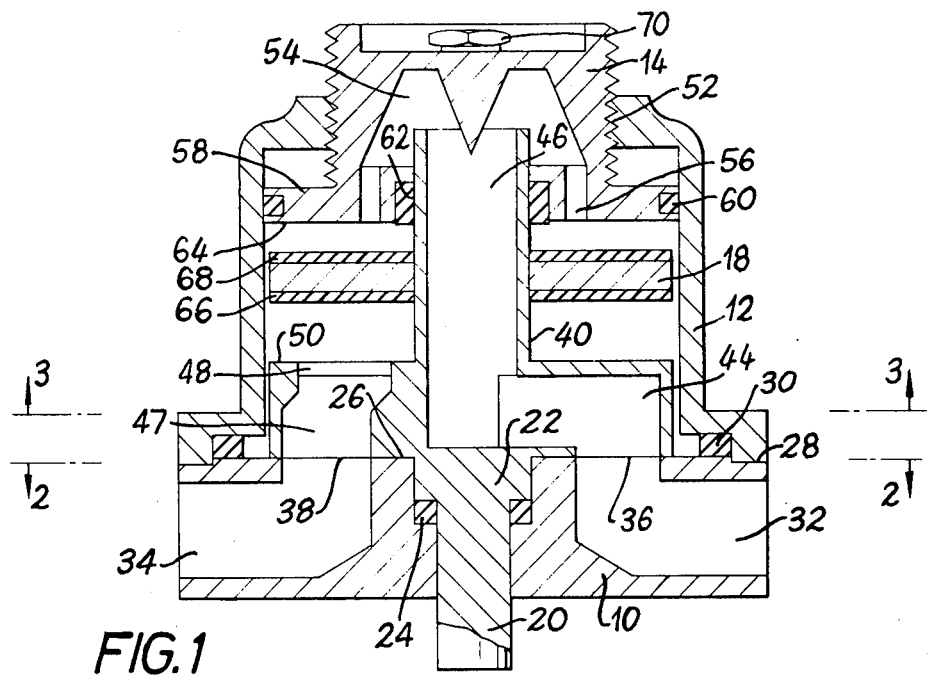

United States Patent [19]

Langlais

[11] 4,036,409
[45] July 19, 1977

[54] FLUID METERING DEVICE

[76] Inventor: Jules Langlais, 8 Rue Claude Debussy, 59130 Lambersart, France

[21] Appl. No.: 678,472

[22] Filed: Apr. 20, 1976

[30] Foreign Application Priority Data

Apr. 23, 1975 France ............................ 75.12582
Feb. 12, 1976 France ............................ 76.03825

[51] Int. Cl.$^2$ ............................................. G01F 11/04
[52] U.S. Cl. .................................................... 222/249
[58] Field of Search ...................... 222/249, 250, 335

[56] References Cited

U.S. PATENT DOCUMENTS

| 507,316 | 10/1893 | Fowler | 222/250 |
| 3,487,980 | 1/1970 | Tanner | 222/250 |

FOREIGN PATENT DOCUMENTS 1,213,276  11/1970  United Kingdom ............... 222/249

Primary Examiner—Stanley H. Tollberg
Assistant Examiner—Hadd Lane
Attorney, Agent, or Firm—Kemon & Estabrook

[57] ABSTRACT

A fluid metering device comprising a sealed casing provided with an inlet pipe and a delivery pipe for the metered fluid, a piston defining two variable-volume chambers in the casing and a distribution unit which rotates or oscillates in the casing and co-operates in sealing-tight manner with the part of the walls adjacent the pipes, the unit being formed with a first passage opening directly into the first chamber and a second passage prolonged by a tubular portion which extends through the piston via an orifice along which it can slide, and which opens into the second chamber, the two passages being such that, during a portion of the rotation or oscillation, the inlet pipe is connected to the first of the two chambers and the delivery pipe is connected to the second chamber and, during another portion of the rotation or oscillation, the delivery pipe is connected to the first chamber and the inlet pipe to the second chamber, the resulting alternate connection causing the element forming a piston to move and deliver the fluid admitted into each of the two chambers, characterized in that the casing is a hollow cylinder, the base of which extends in a plane perpendicular to its generatrices, the inlet and delivery pipes opening on to the base, the perpendicular plane co-operating in sealing-tight manner with the plane surfaces bounding the orifices of the two passages which extend through the distribution unit.

7 Claims, 3 Drawing Figures

FLUID METERING DEVICE

The invention relates mainly to improvements to a volumetric fluid metering device of the type comprising a sealed casing provided with an inlet pipe and a delivery pipe for the metered fluid, a piston defining two variable-volume chambers in the casing and a distribution unit which rotates or oscillates in the casing and co-operates in sealing-tight manner with the part of the walls adjacent the pipes, the unit being formed with a first passage opening directly into the first chamber and a second passage prolonged by a tubular portion which extends through the piston via an orifice along which it can slide, and which opens into the second chamber, the two passages being such that, during a portion of the rotation or oscillation, the inlet pipe is connected to the first of the two chambers and the delivery pipe is connected to the second chamber and, during another portion of the rotation or oscillation, the delivery pipe is connected to the first chamber and the inlet pipe to the second chamber, the resulting alternate connection causing the element forming a piston to move and deliver the fluid admitted into each of the two chambers.

A main object of the invention is to design a simple device which is particularly adapted to obtain perfect sealing-tightness between the inlet pipe and the delivery pipe when the controls are mechanically immobilised, without any adjustment over a wide pressure range, for the purpose of obtaining a very low internal pressure drop, so that compressible fluids can be accurately metered.

To this end, according to the invention, an attempt is made to obtain good sealing-tightness between the distribution block and the base of the casing, and the cover is designed so that the piston is appropriately pressed against the unit at one end position and against the cover at the other end position. According to another feature, the cover can be inserted into the casing, e.g. by screwing, so as to ensure complete sealing-tightness by simultaneously pressing the two surfaces of the piston against the distribution unit and against the cover, which is an advantage when the device remains unused for a fairly long period.

Figure 2:
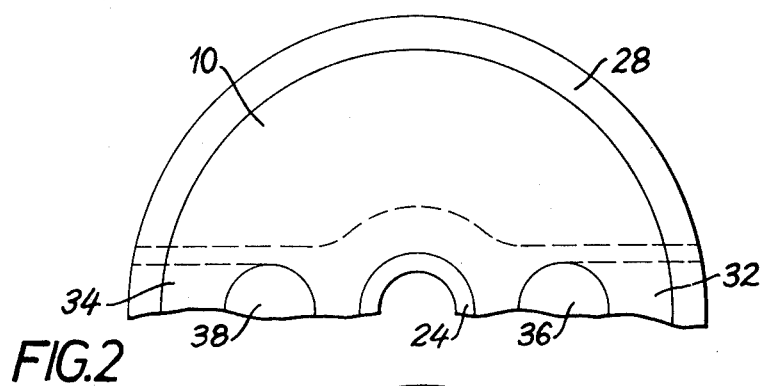
Figure 3:
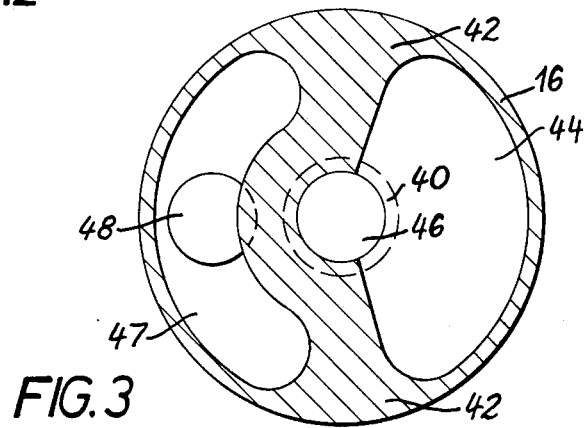

The invention will now be described with reference to the accompanying drawings showing a preferred embodiment, in which:

FIG. 1 is an axial section through a fluid proportioning device according to the invention, FIG. 2 is a view along line 2 — 2 of the base of the device, and FIG. 3 is a view along line 3 — 3 of the distribution unit.

The fluid metering device shown in the drawings mainly comprises a stand or base 10, a wall 12 which is a cylinder of revolution in the example, and a cover 14. Base 10, wall 12 and cover 14 together define a sealing-tight casing in which a distribution unit 16 and a piston 18 are mounted.

Base 10, which is shown in axial section in FIG. 1 and in partial plan view in FIG. 2, is a cylindrical block having parallel surfaces. It has a central stepped bore, the small-diameter part of which receives the free end of the control shaft 20 of the distribution unit 16, whereas the larger-diameter part receives the central portion 22 of shaft 20 and a seal 24 forming a gland. Base 10 has a completely flat, smooth upper surface 26, adapted to co-operate with the bottom surface of the distribution block. Base 10 has a peripheral recess 28 which engages the bottom end of the wall of casing 12, which presses against surface 26 of an O-ring 30.

Base 10 comprises an inlet pipe 32 and a delivery pipe 34 for the metered fluid. Pipes 32, 34 open into the casing through circular apertures 36, 38 which are substantially diametrically opposite and at equal distances from the axis and are covered by unit 16.

Unit 16 is a cylindrical drum of revolution which, relative to the drawing, is prolonged downwards by shaft 20–22 and upwards by a coaxial tubular portion 40. A partition 42 extends substantially diametrically in the drum, where it defines two cavities. One cavity, to the right in FIG. 3, is denoted by reference 44. It is connected to the central passage 46 defined by the inner walls of the tubular portion 40. The other cavity, to the left in FIG. 3, is denoted by reference 47. It is crescent-shaped and communicates with the interior of casing 12 via an orifice 48. The top surface 50 of unit 16 is completely plane, and is an annular surface surrounding the tubular portion 40 and formed with the aforementioned orifice 48.

At the top end, the casing wall 12 has internal threading 52 onto which cover 14 is screwed. Cover 14 has a substantially toric cavity 54 coaxial with pipe 40, which can extend into cavity 54 and is connected to the casing interior via ducts 56 distributed around pipe 40. Cover 14 has a plate-shaped base 58 co-operating in sealing-tight manner via an O-ring 60 with the inner surface of wall 12, so as to prevent any leakage through the threads. There is also a seal 62 between cavity 54 and the tubular portion 40. The surface 64 of plate 58 adjacent piston 18 is completely plane, so that the piston can press against it in sealing-tight manner so as to block up ducts 56 when it reaches its top end position. In order to improve the sealing-tightness against surface 50 of unit 16 at the bottom end position and against surface 64 of the cover at the top end position, the respective surfaces of the piston are lined with elastomeric materials in the form of rings 66, 68. Cover 14 has an internal hexagonal projection 70 for screwing or unscrewing it in the casing, so as to adjust the travel of piston 18.

The aforementioned fluid metering device operates as follows. When pipe 32 is supplied with fluid, the fluid travels via aperture 36 into cavity 44 in the distribution unit, travels to cavity 54 in the cover and flows out through duct 56, thus pressing downwards the piston 18, which delivers the liquid in the chamber defined by its bottom surface 66 and the surface 50 of unit 16. The delivered fluid travels out through orifice 48 and pipe 34.

If the distribution unit is turned through an angle (by rotation or oscillation of shaft 20–22) aperture 36 of pipe 32 is connected to cavity 47 and fluid flows into the bottom chamber, and simultaneously pipe 34 is connected to cavity 44, so that the piston moves upwards and delivers the fluid which has previously been introduced into the top chamber.

In the device according to the invention, the thickness of partition 42 is such that it is possible only to supply the bottom chamber or the top chamber or neither. If the distributor stops rotating or oscillating, sealing-tightness between inlet 32 and delivery 34 is maintained, either by partition 42 blocking one of the orifices 36 and 38, or by ducts 56 being blocked by the top surface 68 of the piston, or by orifice 48 being blocked by the bottom surface 66 of the piston. The aforementioned simple sealing means 62, 66, 68 provide excellent sealing-tightness over a wide pressure range without adjustment, but according to another feature, if the device is stopped for a long time, cover 14 is screwed all the way down, so that the sealing means simultaneously co-operate mechanically with surface 64 of cover 14 and surface 50 of unit 16.

Note that the device proposed according to the invention can obviate sealing-tightness producing friction and wear between piston 18 and the wall of casing 12 and/or between piston 18 and the tubular portion 40.

I claim:

1. a fluid metering device comprising a sealed casing provided with an inlet pipe and a delivery pipe for the metered fluid, a piston defining two variable-volume chambers in the casing and a distribution unit which rotates or oscillates in the casing and co-operates in sealing-tight manner with the part of the walls adjacent the pipes, the unit being formed with a first passage opening directly into the first chamber and a second passage prolonged by a tubular portion which extends through the piston via an orifice along which it can slide, and which opens into the second chamber, the two passages being such that, during a portion of the rotation or oscillation, the inlet pipe is connected to the first of the two chambers and the delivery pipe is connected to the second chamber and, during another portion of the rotation or oscillation, the delivery pipe is connected to the first chamber and the inlet pipe to the second chamber, the resulting alternate connection causing the element forming a piston to move and deliver the fluid admitted into each of the two chambers, characterised in that the casing is a hollow upright cylinder, the base of which provides a plane upper surface perpendicular to the generating axis of the cylinder, the inlet and delivery pipes opening on to the said surface, the said surface co-operating in sealing-tight manner with movable plane surfaces of the distribution unit which bound the orifices of the two passages which extend from below and through the distribution unit.

2. A fluid proportioning device according to claim 1, characterised in that the piston comprises a plate formed with an orifice which slides so as to cooperate with the tubular portion of the distributor, the surface of the plate opposite the distributor being adapted to co-operate with sealing means so that, at the end of its travel toward the distributor, it blocks a or the orifices on its surface.

3. A fluid metering device according to claim 1, characterised in that the casing is closed by a cover co-operating with the piston to define a second chamber, the cover having a central cavity into which the free end of the tubular portion emerges, the cavity being connected to the second chamber by at least one duct adapted to be blocked by sealing means co-operating with the adjacent surface of the piston when the piston reaches the end of its travel towards the cover.

4. A fluid metering device according to claim 3, characterised in that the tubular portion of the distributor co-operates with a seal disposed in the wall separating the tubular portion from a or the ducts connecting the cavity in the cover to the second chamber, the seal being adapted to co-operate at the end-of-travel position with that surface of the piston which is opposite the cover.

5. A fluid metering device according to claim 3, characterised in that at least one surface of the piston comprises sealing means which, at the end of travel, block a or the orifices in the cover or the distribution block opening into the chamber adjacent to that surface of the piston which is provided with the sealing means.

6. A fluid proportioning device according to claim 3, characterised in that the cover co-operating with the piston to define the second chamber is adjustable telescopically or by screwing into the lateral wall of the casing, so as to adjust the travel of the piston in the casing.

7. A fluid metering device according to claim 6, characterised in that the cover, which is mounted telescopically or by screwing in the casing, can penetrate into it by an amount sufficient to lock the piston against the surface of the distribution block.

* * * * *